United States Patent [19]
Jovanovic et al.

[11] Patent Number: 6,028,418
[45] Date of Patent: Feb. 22, 2000

[54] BOOST CONVERTER WITH MINIMUM-COMPONENT-COUNT ACTIVE SNUBBER

[75] Inventors: Milan M. Jovanovic, Cary; Yungtaek Jang, Apex, both of N.C.

[73] Assignee: Delta Electronics, Inc., Taipei, Taiwan

[21] Appl. No.: 09/249,731

[22] Filed: Feb. 11, 1999

[51] Int. Cl.$^7$ .................................................. G05F 1/613
[52] U.S. Cl. .............................................. 323/222; 363/60
[58] Field of Search ................................. 323/222, 282, 323/283, 351, 290; 363/59, 60

[56] References Cited

U.S. PATENT DOCUMENTS

| | | | |
|---|---|---|---|
| 4,673,865 | 6/1987 | DeLuca et al. | 323/222 |
| 5,418,704 | 5/1995 | Hua et al. | 363/21 |
| 5,446,366 | 8/1995 | Bassett et al. | 323/222 |
| 5,543,704 | 8/1996 | Thoren | 323/222 |
| 5,659,241 | 8/1997 | Horiuchi et al. | 323/222 |
| 5,691,632 | 11/1997 | Otake | 323/282 |
| 5,736,842 | 4/1998 | Jovanovic | 323/222 |
| 5,793,190 | 8/1998 | Sahlstrom et al. | 323/222 |
| 5,861,734 | 1/1999 | Fasullo et al. | 323/222 |
| 5,889,390 | 3/1999 | Preis et al. | 323/222 |
| 5,909,108 | 6/1999 | He et al. | 323/225 |
| 5,914,587 | 6/1999 | Liu | 323/222 |
| 5,923,152 | 7/1999 | Guerrera | 323/222 |
| 5,923,153 | 7/1999 | Liu | 323/222 |

OTHER PUBLICATIONS

"New Fast Recovery Diode Technology Cuts Circuit Losses, Improves Reliability", Y. Khersonsky, etc. PCIM, May 1992, pp. 16–25.

"High Efficiency Telecom Rectifier Using a Novel Soft-–Switched Boost–Based Input Current Shaper", Robert Streit, Daniel Tollik, IEEE Intelec, Nov. 1991, pp. 720–726.

"Switched Snubber For High Frequency Switching", Koosuke Harada, Hiroshi Sakamoto, IEEE, 1990, pp. 181–188.

*Primary Examiner*—Adolf Deneke Berhane
*Attorney, Agent, or Firm*—Skjerven, Morrill, MacPherson, Franklin & Friel; Edward C. Kwok

[57] ABSTRACT

A boost converter includes a novel active snubber which reduces losses caused by the reverse-recovery characteristic of the boost rectifier. The active snubber includes a snubber inductor, a ground-referenced referenced auxiliary switch, and a snubber rectifier. The losses are reduced by inserting the snubber inductor in series with the boost switch and the boost rectifier, so as to control the rate of change (di/dt) of the boost rectifier current during the rectifier's turn-off. A proper operation of the proposed circuit requires overlapping gate drives of the main and the auxiliary switches. The component voltage and current stresses in the proposed circuit are similar to those in the conventional, "hard-switched" boost converter.

11 Claims, 12 Drawing Sheets

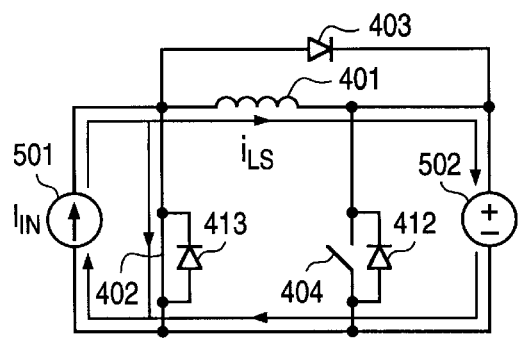
FIG. 6A [T₀ - T₁]
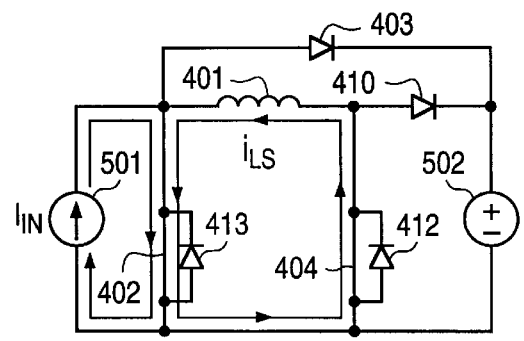
FIG. 6E [T₄ - T₅]
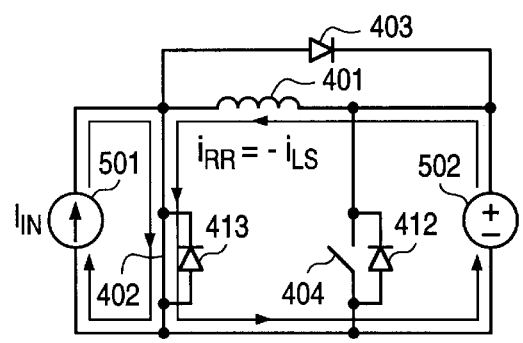
FIG. 6B [T₁ - T₂]
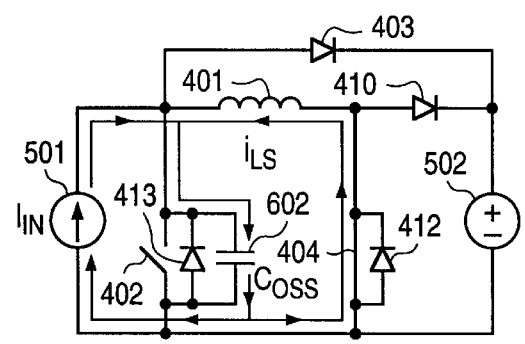
FIG. 6F [T₅ - T₆]
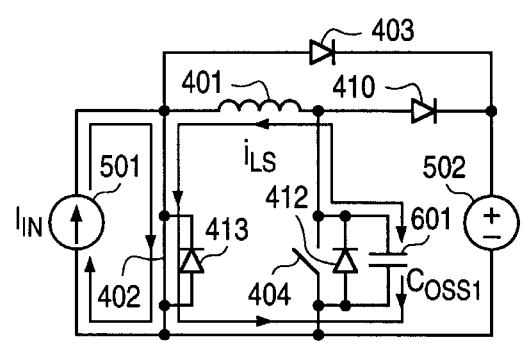
FIG. 6C [T₂ - T₃]
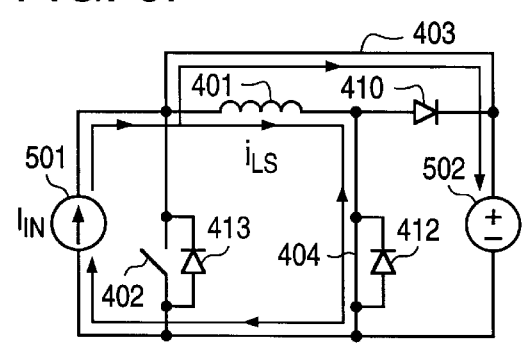
FIG. 6G [T₆ - T₇]
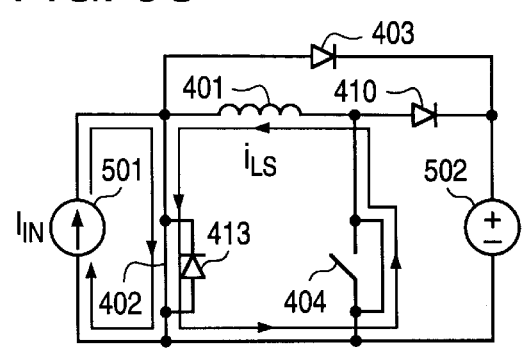
FIG. 6D [T₃ - T₄]

BOOST CONVERTER WITH MINIMUM-COMPONENT-COUNT ACTIVE SNUBBER

BACKGROUND OF THE INVENTION

1. Field of the Invention

The present invention relates to power converters. In particular, the present invention relates to continuous-conduction mode boost converters.

2. Discussion of the Related Art

Generally, at a higher power level, a continuous-conduction-mode boost converter is a preferred implementation of a front-end converter with active input-current shaping. The output voltage of such a boost input-current shaper is relatively high, since the DC output voltage of the boost converter must be higher than the peak input voltage. Due to this high output voltage, a fast-recovery boost rectifier is required. At a high switching frequency, a fast-recovery rectifier produces a significant reverse-recovery-related loss when it is switched under a "hard-switching" condition. (See, for example, "New fast recovery diode technology cuts circuit losses, improves reliability," by Y. Kersonsky, M. Robinson, and D. Gutierrez, Power Conversion & Intelligent Motion (PCIM) Magazine, pp. 16–25, May 1992.) As a result, "hard-switched", boost input-current-shapers are operated at relatively low switching frequencies to avoid a significant deterioration of their conversion efficiencies. Using a soft-switching technique, the switching frequency and, therefore, the power-density of the boost, front-end converter can be increased.

So far, a number of soft-switched boost converters and their variations have been proposed. Some examples of soft-switched boost converters are disclosed in the following references: (a) "High efficiency telecom rectifier using a novel soft-switched boost-based input current shaper," ("Streit") by R. Streit, D. Tollik, International Telecommunication Energy Conf. (INTELEC) Proc., pp. 720–726, October 1991; (b) U.S. Pat. No. , 5,418,704 ("Hua et al."), entitled "Zero-Voltage-Transition Pulse-Width-Modulated Converters" to G. Hua, F. C. Lee, issued May 23, 1995; (c) U.S. Pat. No. 5,446,336, entitled "Boost Converter Power Supply with Reduced Losses, Control Circuit and Method Therefor" ("Bassett et al.") to J. Bassett and A. B. Odell, issued Aug. 29, 1995; and (d) U.S. Pat. No. 5,736,842 ("Jovanovic"), entitled "Technique for reducing rectifier reverse-recovery-related losses in high-voltage, high-power converters," to M. Jovanovic, issued Apr. 7, 1998.

Each of the references (a)–(d) above discloses an auxiliary active switch operating together with a few passive components (e.g., inductors and capacitors), thus forming an active snubber that is used to control the rate of change of rectifier current (di/dt) and to create conditions for zero-voltage switching (ZVS) of the main switch and the rectifier. Active snubbers are described, for example, in "Switched snubber for high frequency switching," ("Harada et al.") by K. Harada, H. Sakamoto, IEEE Power Electronics Specialists' Conf (PESC) Rec., pp. 181–188, June 1990. FIGS. 1–3 show the soft-switched boost circuit introduced in Hua et al., Bassett et al., and Jovanovic, respectively.

The boost converter circuits proposed in Streit and Hua et al. use a snubber inductor connected to the common node of the boost switch and the rectifier to control the rate of change of rectifier current (di/dt). As a result of the snubber-inductor location, the main switch and the rectifier in the circuits proposed in Streit and Hua et al. possess minimum voltage and current stresses. In addition, the boost switch closes and the rectifier turns off under zero-voltage (soft-switching) conditions. However, the auxiliary switch operates under "hard" switching conditions, as it is closed while its voltage is equal to the output voltage, and subsequently opened while carrying a current greater than the input current.

In the circuits of Bassett et al. and Jovanovic, the rate of change of rectifier current is controlled by a snubber inductor connected in series with the boost switch and the rectifier. Because of this placement of the inductor, the voltage stress of the main switch is higher than that of the circuits described in Streit and Hua et al. This increased voltage stress can be minimized by a proper selection of the snubber-inductance value and the switching frequency, as taught in Jovanovic. Both the boost and auxiliary switches in the circuits in Bassett et al. and Jovanovic, as well as the boost rectifier, operate under ZVS conditions.

The major deficiency of the boost converters described in Streit and Hua et al. is a severe, undesirable resonance between the output capacitance $C_{OSS}$ of the auxiliary switch and the resonant inductor. The undesirable resonance occurs after the auxiliary switch is opened and the snubber inductor current falls to zero and adversely affects the operation of the circuit and must be eliminated. For example, in the circuit introduced in Hua et al., the resonance is eliminated by connecting a rectifier and a saturable inductor in series with the snubber inductor, as shown in FIG. 1, which degrades the conversion efficiency and increases both the component count and the cost of the circuit.

The circuits described in Bassett et al. and Jovanovic require either an isolated (high-side) gate drive, which increases circuit complexity and cost. Also, the circuit introduced in Jovanovic requires noise-robust gate-drive timing since accidental transient overlapping of the main and auxiliary switch gate drives may lead to a fatal circuit failure resulting from the relatively large transient current through the series connection of the simultaneously-conducting main and auxiliary switches. (The circuit introduced in Bassett et al. does not suffer from the overlapping gate-drive problem because it requires overlapping gate drive for proper operation.)

SUMMARY OF THE INVENTION

The present invention provides a technique which improves the performance of the boost circuit by eliminating the reverse-recovery-related losses in the boost switch and the boost rectifier, using an active snubber with a small number of components. This minimum-component-count snubber requires only a snubber inductor, an auxiliary switch, and a rectifier.

The technique of the present invention reduces reverse-recovery-related losses by controlling the rate of change of the boost rectifier current with a snubber inductor connected in series with the boost switch and boost rectifier. Since the auxiliary switch in a boost power stage of the present invention has a terminal connected to the circuit ground, a non-isolated (direct) gate drive can be used. In addition, because the proper operation of the boost power stage requires that the conduction periods of the main and auxiliary switches overlap, a boost power stage of the present invention is not susceptible to failures due to accidental transient overlapping of the main and the auxiliary switch gate drives. Finally, the voltage and current stresses of the components in the active-snubber boost converter of the present invention are similar to those in conventional "hard-switched" counterparts.

The present invention is better understood upon consideration of the detailed description below and the accompanying drawings.

BRIEF DESCRIPTION OF THE DRAWINGS

FIGS. 6(a)–6(m) show topological stages of boost power stage 400 during a switching cycle, under a first operation mode.

DETAILED DESCRIPTION OF THE PREFERRED EMBODIMENTS

Figure 1:
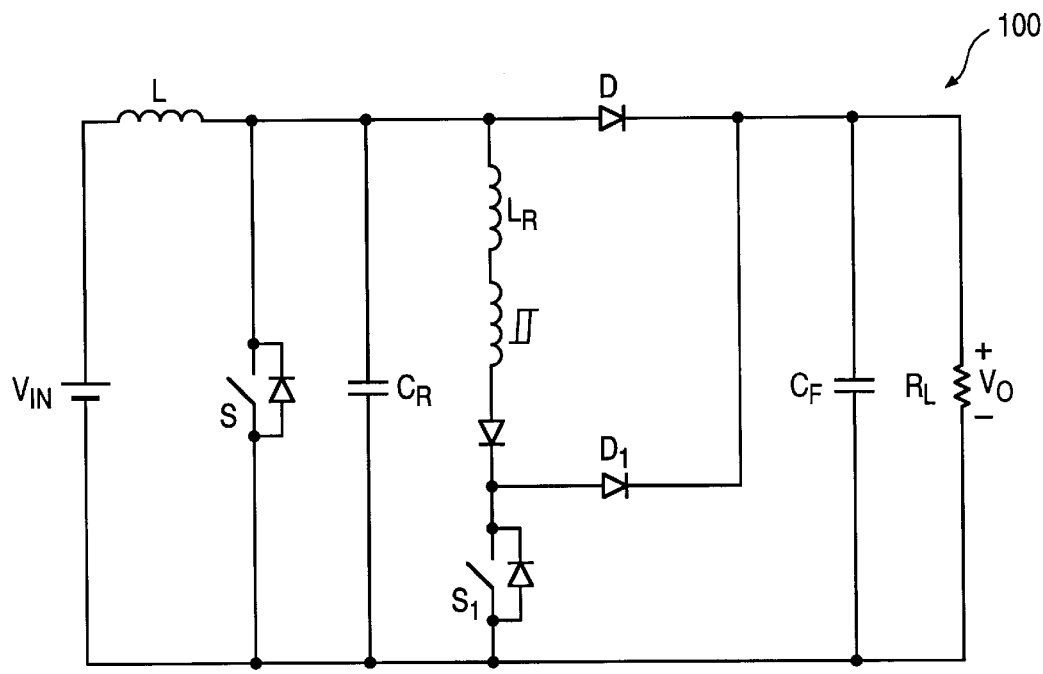
FIG. 1 shows a boost power stage 100 with active snubber introduced, as disclosed in Hua et al. (prior art).
Figure 2:
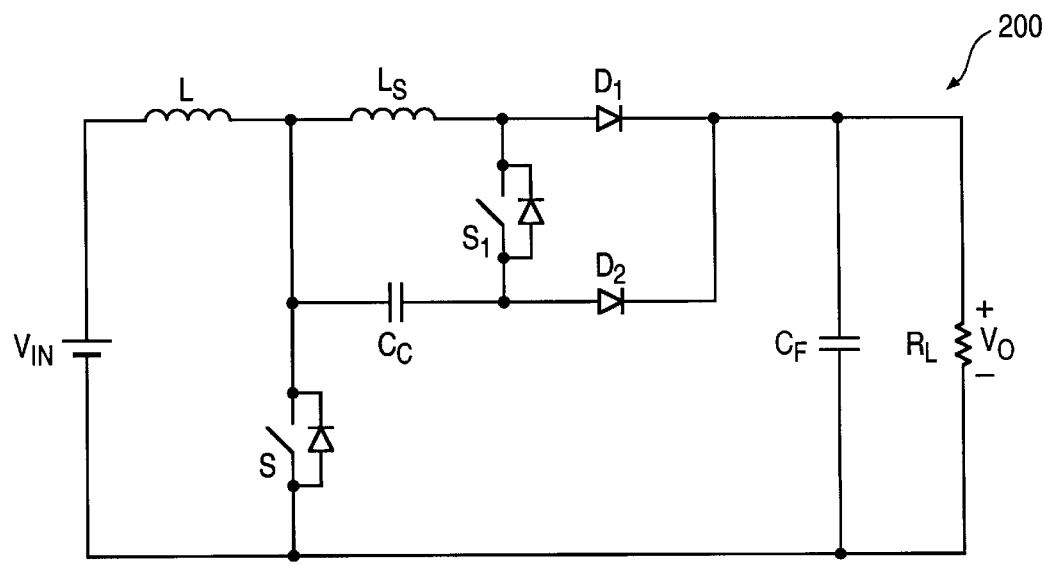
FIG. 2 shows a boost power stage 200 with active it snubber introduced, as disclosed in Bassett et al (prior art).
Figure 3:
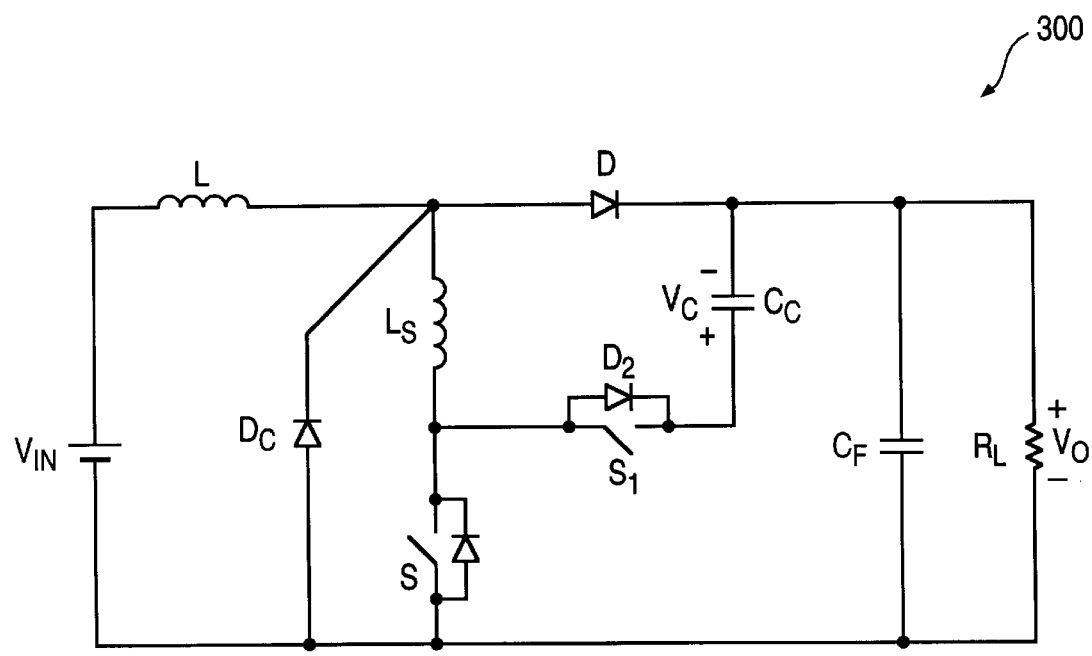
FIG. 3 shows a boost power stage 300 with active snubber introduced, as disclosed in Jovanovic (prior art).

To simplify the description below and to facilitate cross-reference among the various figures, like elements in the various figures are provided like reference numerals.

Figure 4:
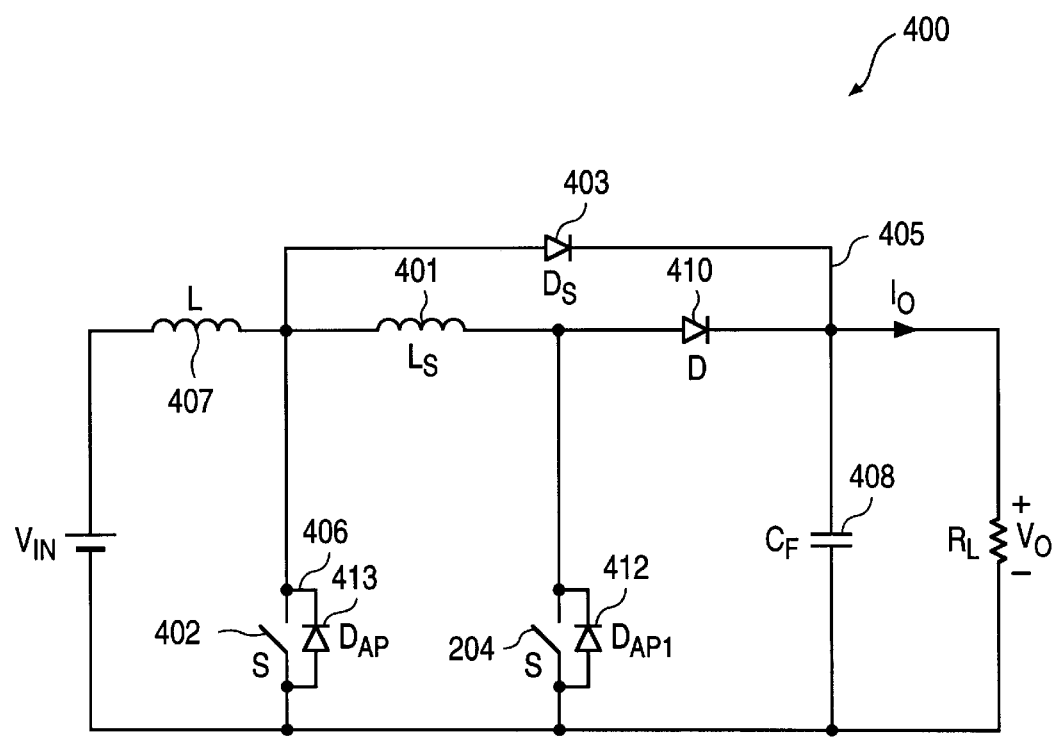
FIG. 4 shows a boost power stage 400 with a minimum-component-count active snubber, in accordance with the present invention.

FIG. 4 shows a boost power stage 400 with reduced reverse-recovery loss, in accordance with one embodiment of the present invention. Boost power stage 400 uses snubber inductor 401 ($L_S$) connected in series with boost switch 402 (S) and boost rectifier 410 (D) to control the rate of change of boost rectifier current (di/dt). The snubber action is initiated by turning on auxiliary switch 404 ($S_1$), which is connected between an anode of boost rectifier 410 (D) and circuit ground. Snubber rectifier 403, which is connected between terminal 406 of boost switch 402 and output terminal 405, clamps the voltage at terminal 406 of boost switch 402 to the output voltage $V_0$ after boost switch 402 is opened.

Figure 5:
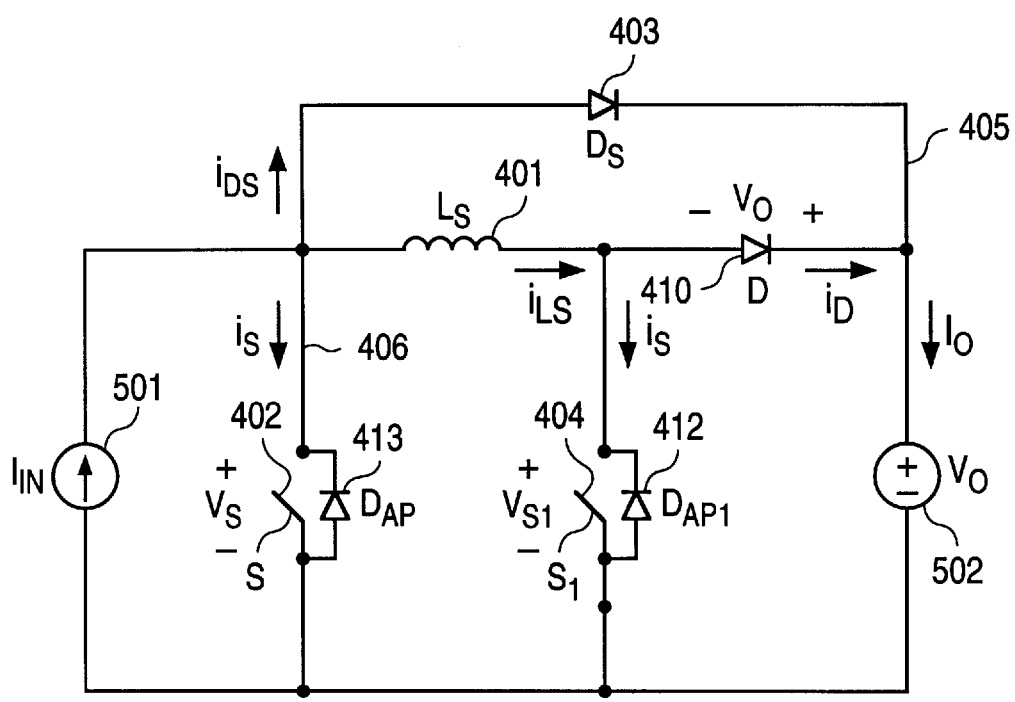
FIG. 5 is a simplified circuit model of boost power stage 400, showing reference directions of currents and voltages.
Figures 6H, 6K:
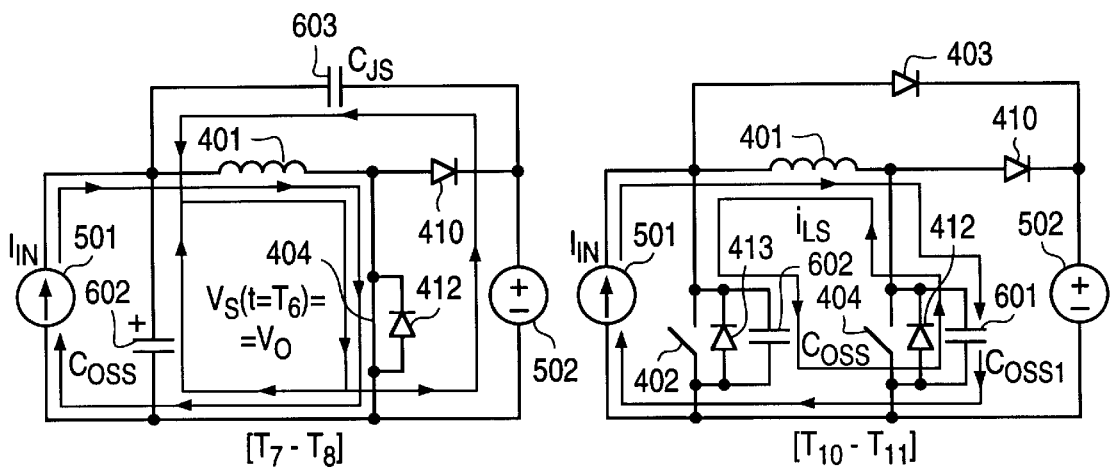
Figures 6I, 6L:
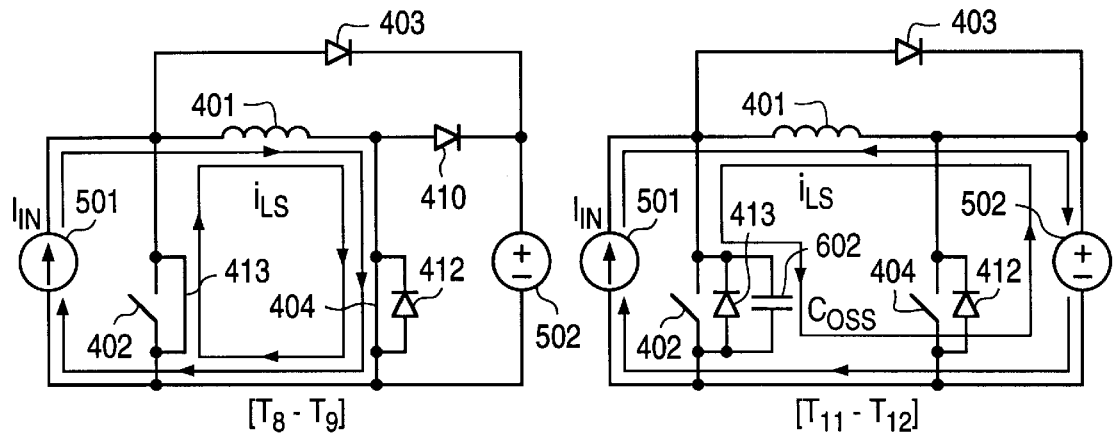

A model of boost power stage 400 is provided in FIG. 5. Because the inductance of boost inductor 407 is relatively large, boost inductor 407 is represented in FIG. 5 by a constant-current source 501 with a current $I_{IN}$. Further, since the ripple voltage at terminal 405 is small, FIG. 5 models the voltage across the output filter capacitor 408 ($C_F$) by a constant-voltage source 502 with voltage $V_O$. Also, the resistances of conducting semiconductor devices (e.g., switches 402 and 404, rectifiers 403 and 410) are modeled by short circuits. However, the output capacitance of switches 402 and the reverse-recovery charge of rectifier 410 are not neglected. To illustrate the operation of boost power stage 400, FIG. 6 shows topological stages of boost power stage 400 during a switching cycle. FIG. 7 shows key waveforms of boost power stage 400. As shown in FIG. 7, waveforms 701 and 702, corresponding to the overlapping gate-drive signals $G_S$ and $G_{S1}$ of switches 402 and 404 (i.e., both switches 402 and 404 conduct simultaneously.), respectively, operate boost power stage 400.

Initially (i.e., before boost switch 402 closes at time t=$T_0$), as shown in FIG. 7, input current $I_{IN}$ flows through snubber inductor 401 (current $i_{LS}$) and boost rectifier 410 (current $i_D$). At the same time, auxiliary switch 404 is open, so that output voltage $V_O$ is imposed across auxiliary switch 404. Snubber rectifier 403 carries a relatively small current whose origin is explained below.

At time t=$T_0$, after switch 402 is closed (i.e., conducting), as shown in FIG. 6(a), current $i_{DS}$ which was flowing through snubber rectifier 403 is instantaneously transferred to switch 402, and snubber rectifier 403 becomes non-conducting with a reverse voltage equal to output voltage $V_0$. At this time, constant voltage $V_0$ is applied across snubber inductor 401, and inductor current $i_{LS}$ and boost rectifier current $i_D$ decrease linearly, as shown in waveforms 706 and 709, respectively. Correspondingly, current $i_S$ in switch 402 increases at the same rate. Boost rectifier current $i_D$ decreases according to:

$$\frac{di_D}{dt} = -\frac{V_O}{L_S} \quad (1)$$

Since the rate of decrease of rectifier current $i_D$ is controlled by inductance $L_S$ of snubber inductor 401, boost rectifier 410's recovered charge and the associated losses are reduced by a proper selection of inductance $L_S$ of snubber inductor 401. Generally, a larger $L_S$, which gives a lower rate of decrease of boost rectifier current, results in a more efficient reduction of the reverse-recovery-associated losses.

At time t=$T_1$, when current $i_{LS}$ and $i_D$ decrease to zero, the entire input current $I_{IN}$ flows through boost switch 402, as shown in waveforms 706, 709 and 705 of FIG. 7. Ideally, when boost rectifier current $i_D$ falls to zero at time t=$T_1$, boost rectifier 410 becomes non-conducting. However, due to a residual stored charge, a reverse-recovery current $i_{rr}$ flows through boost rectifier 410 and snubber inductor 401 as shown in FIG. 6(b). At time t=$T_2$ (i.e, after boost rectifier 410 recovers and becomes non-conducting), capacitance 601 ($C_{OSS1}$) of auxiliary switch 404 begins to discharge in a resonant fashion to provide current $i_{LS}$ of snubber inductor 401, as shown in FIG. 6(c). During this period of resonance, negative current $i_{LS}$ increases by an amount $$\frac{V_O}{\sqrt{\frac{L_S}{C_{OSS1}}}},$$

as indicated in waveform 706 in FIG. 7.

After capacitance 601 is completely discharged at time t=$T_3$, current $i_{LS}$ of snubber inductor 401 flows through antiparallel diode 412 of auxiliary switch 404, as indicated in FIG. 6(d). Thus, at time t=$T_4$, when auxiliary switch 404 is closed (waveform 702), antiparallel diode 412 is conducting, so that auxiliary switch 404 is closed under a zero-voltage-switching (ZVS) condition. After auxiliary switch 404 is closed, current $i_{LS}$ flows through auxiliary switch 404, rather than antiparallel diode 412, as shown in FIG. 6(e).

At time t=$T_5$, boost switch 402 is opened, so that switch current is (waveform 705) charges output capacitance 602 ($C_{OSS}$), as shown in FIG. 6(f). As a result, voltage $V_S$ (waveform 703) across boost switch 402 increases. Since input current $I_{IN}$ is much larger than $$|i_{LS}| = \left|i_{rr} + \frac{V_O}{\sqrt{\frac{L_S}{C_{OSS1}}}}\right|,$$

the increase in voltage $v_S$ (waveform 703) across switch 402 is essentially linear. At the same time, as voltage $v_S$ across boost switch 402 increases, snubber inductor current $i_{LS}$ (waveform 706) increases from its initial negative value. When voltage $v_S$ reaches output voltage $V_O$ at time $t=T_6$, current $i_S$ (waveform 705) which was charging capacitance 602 ($C_{OSS}$) becomes zero and snubber rectifier 403 begins to conduct, as shown in FIG. 6(g). Thus, a constant positive voltage is applied across snubber inductor 401, so that current $i_{LS}$ continues to increase linearly (waveform 706). At the same time, current $i_{DS}$ (waveform 708) in snubber rectifier 403 decreases at the same rate, since the sum of currents $i_{LS}$ and $i_{DS}$ equals the constant input current $I_{IN}$. At time $t=T_7$, snubber rectifier current $i_{DS}$ reaches zero (i.e., snubber rectifier 403 becomes non-conducting).

After snubber rectifier 403 becomes non-conducting at time $t=T_7$, boost power stage 400 can have at least two modes of operation depending on the time that auxiliary switch 404 remains closed. If auxiliary switch 404 remains closed for a sufficiently long time after time $t=T_7$, output capacitance 602 of boost switch 402, the junction capacitance 603 ($C_{JS}$) of snubber rectifier 403, and snubber inductance 401 form a resonant circuit, as shown in FIG. 6(h). In this resonant circuit, capacitances 602 and 603 are connected in parallel, so that the total equivalent resonant capacitance $C_{EQ1}$ is given by $C_{EQ1}=C_{OSS}+C_{JS}$. Consequently, voltage $v_S$ across switch 402 begins to decrease toward zero in a resonant fashion, while current $i_{LS}$ in the resonant circuit continues to increase, as illustrated in waveforms 703 and 706 of FIG. 7. This resonant current flows in the negative direction through boost switch 402, and in the positive direction through snubber inductor 401 and auxiliary switch 404, as shown in FIG. 6(h) and waveforms 705 ($i_S$), 706 ($i_{LS}$) and 707 ($i_{S1}$) of FIG. 7. After voltage vs across boost switch 402 decreases to zero at time $t=T_8$, the resonant current continues to flow through antiparallel diode 413, as shown in FIG. 6(i). Since the voltage across snubber inductor 401 is zero at this time, the resonant current remains constant until auxiliary switch 404 opens at time $t=T_9$. The magnitude of the resonant current between time $t=T_8$ and time $t=T_9$, is given by:

$$i_{RES} = \frac{V_O}{\sqrt{\frac{L_S}{C_{EQ1}}}} \quad (2)$$

where $C_{EQ1}=C_{OSS}+C_{JS}$, as stated above.

Figures 6J, 6M:
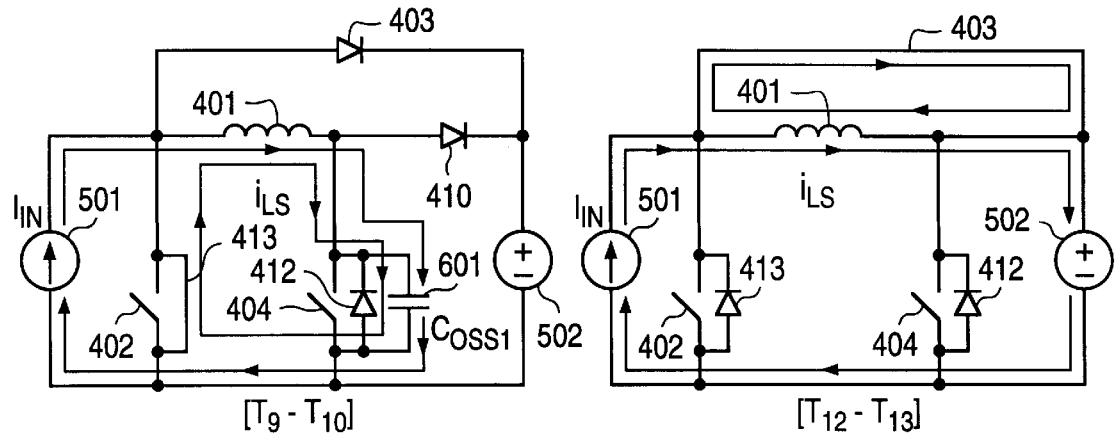
Figure 7A:
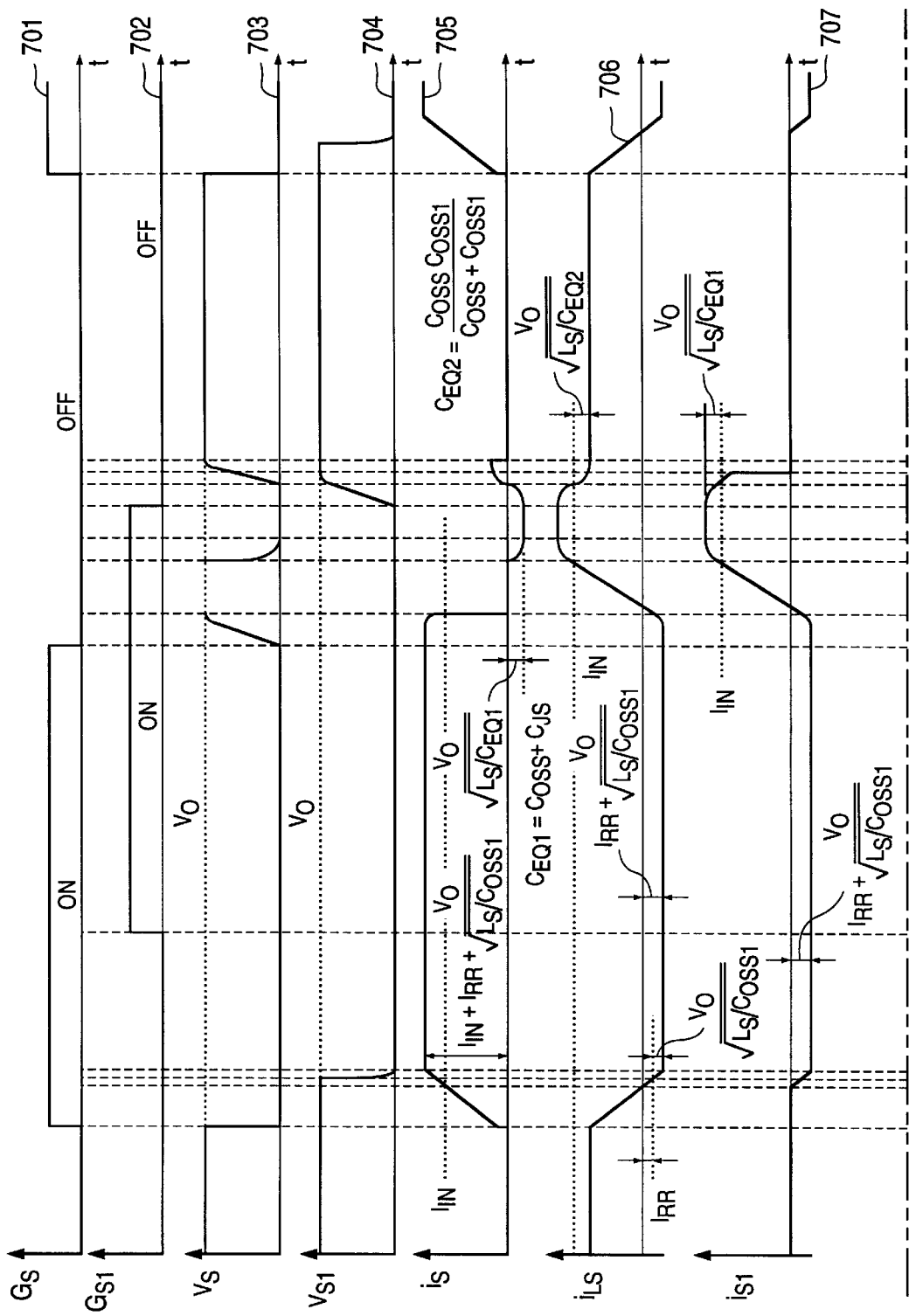
FIG. 7 shows key waveforms of boost power stage 400 under the operation mode of FIGS. 6(a)–6(m).
Figures 7, 7B:
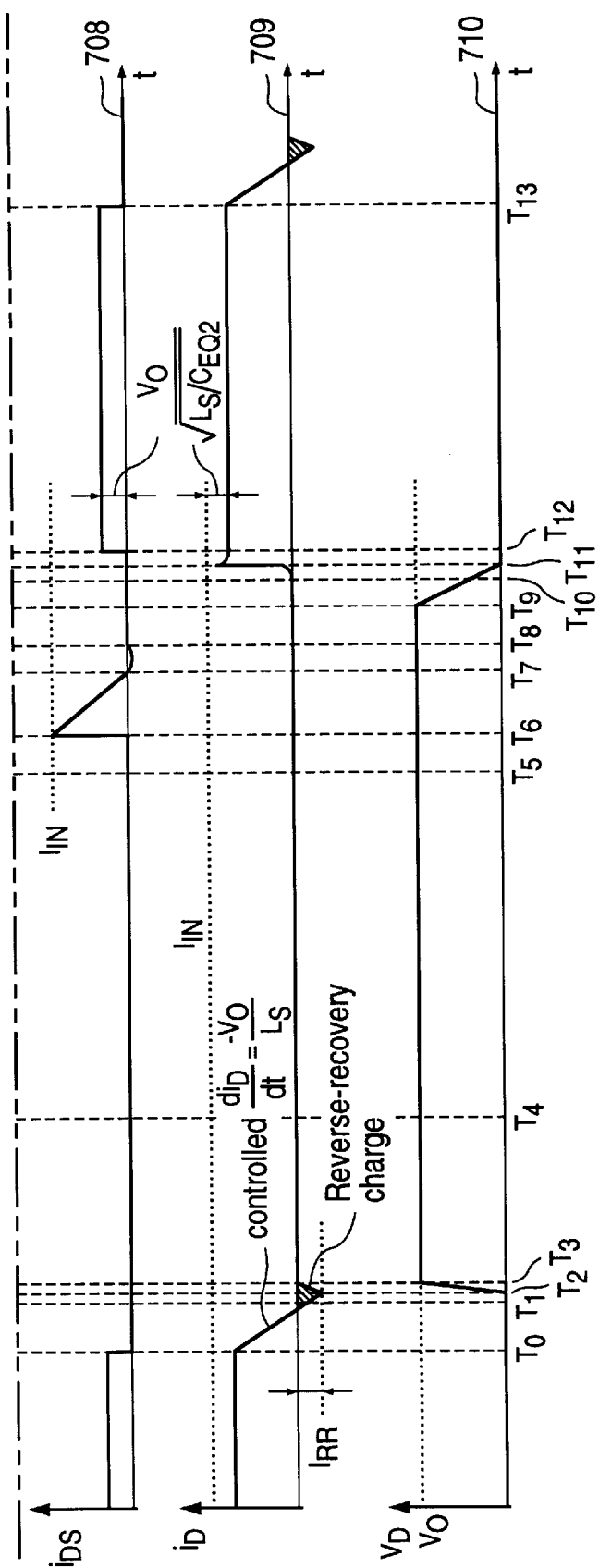

When auxiliary switch 404 opens at time $t=T_9$, current $i_{S1}$ in auxiliary switch 404 (i.e., currents $I_{IN}+i_{RES}$) charges output capacitance 601 ($C_{OSS1}$) of auxiliary switch 404, as shown in FIG. 6(j). Thus, at time $t=T_9$, voltage $v_{S1}$, (waveform 704) begins to increase, and resonant current $i_{RES}$ begins to decrease, as voltage $V_{S1}$ impresses across snubber inductor 401 in the negative direction. As a result, current is (waveform 705) in boost switch 402 increases from the negative value given by Eq. (2) toward zero, while currents $i_{LS}$ (waveform 706) and $i_{S1}$ (waveform 707) in boost inductor 401 and auxiliary switch 404, respectively, decrease toward $I_{IN}$, as illustrated in FIG. 7. When current $i_s$ in boost switch 402 reaches zero (i.e., when currents $i_{LS}$ and $i_{S1}$, reach $I_{IN}$ at time $t=T_{10}$), antiparallel diode 413 becomes non-conducting. As a result, at time $t=T_{10}$, capacitances 602 and 601 of boost switch 402 and auxiliary switch 404, respectively, and snubber inductor 401 form a resonant circuit, as shown in FIG. 6(k). Between time $t=T_{10}$ and time $t=T_{11}$, voltage $V_S$ (waveform 703) across boost switch 402 begins to increase in a resonant fashion, as capacitance 602 ($C_{OSS}$) is charged, while auxiliary switch voltage $V_{S1}$ (waveform 704) continues to increase toward voltage $V_O$, as illustrated in FIG. 7. Current $i_S$ continues to increase in the positive direction, and currents $i_{LS}$ and $i_{S1}$ (in capacitance 601) continue to decrease below $I_{IN}$. When voltage $v_{S1}$, reaches voltage $V_O$ at $t=T_{11}$, auxiliary switch current $i_{S1}$ becomes zero, and current $i_S$ (in capacitance 602) begins to flow through conducting boost rectifier 410, as shown in FIG. 6(l). After time $t=T_{11}$, voltage $v_S$ continues to charge capacitance 602 toward voltage $V_O$, due to a resonance between capacitance 602 ($C_{OSS}$) and snubber inductor 401 ($L_S$), as shown in FIG. 7. At time $t=T_{12}$, when voltage $v_S$ reaches voltage $V_O$, the resonant current through snubber inductor 401 is diverted from capacitor 602 ($C_{OSS}$) to snubber rectifier 403, as shown in FIG. 6(m). This current in snubber rectifier 403 is the small current referred about that exists prior to time $t=T_0$, when boost switch 402 is closed. Boost power stage 400 remains in the state illustrated by in FIG. 6(m) until boost switch 402 is closed at time $t=T_{13}$.

As shown in FIG. 6(m), snubber rectifier 403 is conducting when boost switch 402 is closed at time $t=T_{13}$. Consequently, when boost switch 402 is closed, reverse-recovery of in snubber rectifier 403 introduces losses similar to those of boost rectifier 410. To minimize such losses, current $i_{DS}$ (waveform 708) through snubber rectifier 403 should be kept at a minimum. Generally, current $i_{DS}$ is limited to:

$$i_{DS}(t = T_{12}) = \frac{V_O}{\sqrt{\frac{L_S}{C_{EQ2}}}}$$

$$\text{where } C_{EQ2} = \frac{C_{OSS}C_{OSS1}}{C_{OSS} + C_{OSS1}}.$$

Therefore, to minimize $i_{DS}$, inductance $L_S$ of snubber inductor 401 should be maximized, or the parallel capacitances 601 and 602 should be minimized. The value of inductance $L_S$ is selected based on the maximum switching frequency and the size and cost of snubber inductance ($L_S$), while $C_{EQ2}$ depends upon the selection of boost switch 402 and auxiliary switch 404. Typically, snubber inductance 401 can be selected in the 5 µH–20 µH range. Since minority carrier devices generally possess lower output capacitances, an IGBT (Insulated Gate Bipolar Transistor) is preferable to implement boost switch 402, since boost switch 402 is not closed under ZVS conditions. For auxiliary switch 404, which is always closed under ZVS condition, a MOSFET (Metal Oxide Semiconductor Field Effect Transistor) suffices.

Current $i_{DS}$ through snubber rectifier 403 prior to the closing of boost switch 402 at time $t=T_0$ can be eliminated if auxiliary switch 404 is opened as soon as snubber-rectifier current $i_{DS}$ falls to zero. In fact, for an optimally designed converter, the fixed time interval between the opening of boost switch 402 and the opening of auxiliary switch 404 should be adjusted so that at a low line voltage and a full load, auxiliary switch 404 opens at the moment current $i_{DS}$ reaches zero. Under such an arrangement, even though current $i_{DS}$ is non-zero when auxiliary switch 404 opens under other line voltage and load conditions, current $i_{DS}$ is still small enough so that significant reverse-recovery-related losses do not occur.

Figure 8A:
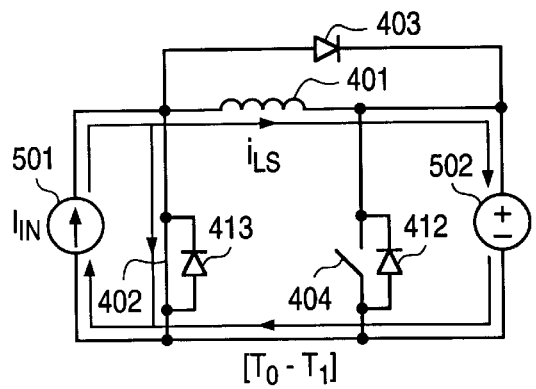
FIGS. 8(a)–8(i) show topological stages of boost power stage 400, under a second operation mode, in which auxiliary switch 404 is opened immediately after current $i_{DS}$ of snubber rectifier 403 falls to zero.
Figure 8D:
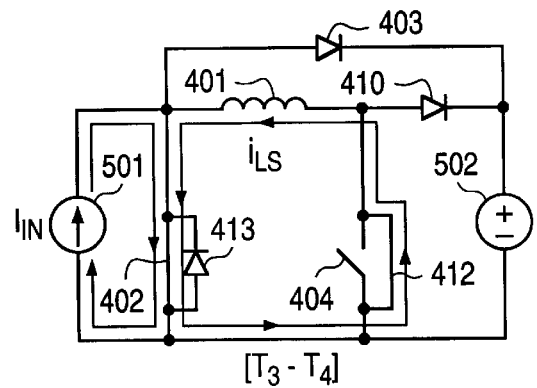
Figure 8B:
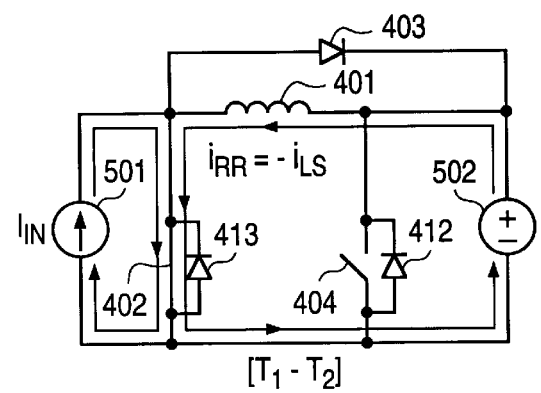
Figure 8E:
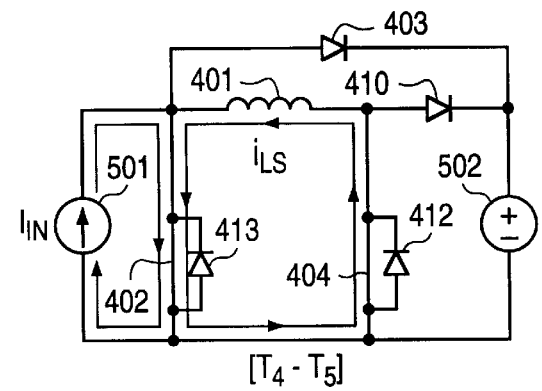
Figure 8C:
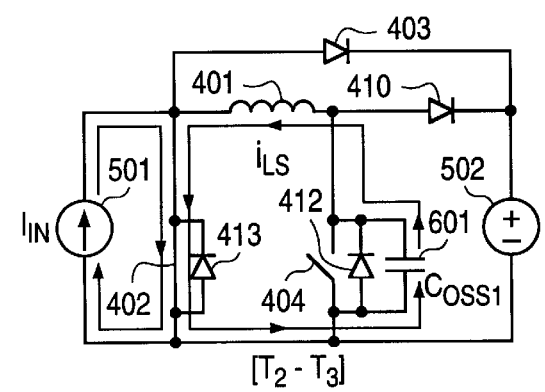
Figure 8F:
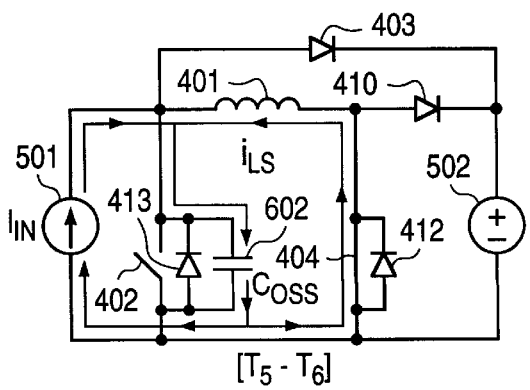
Figure 8G:
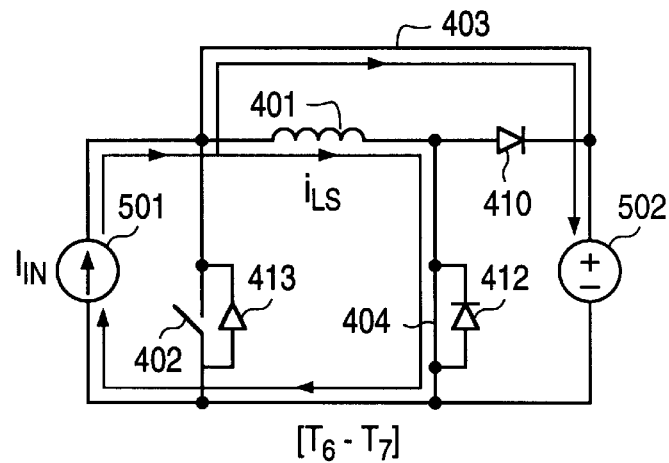
Figure 8H:
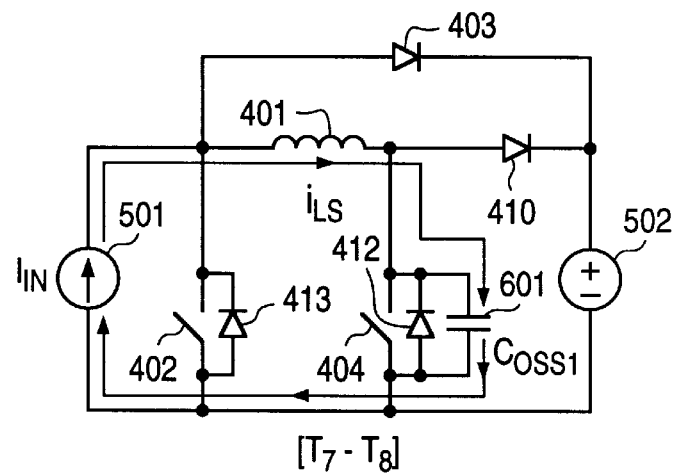
Figure 8I:
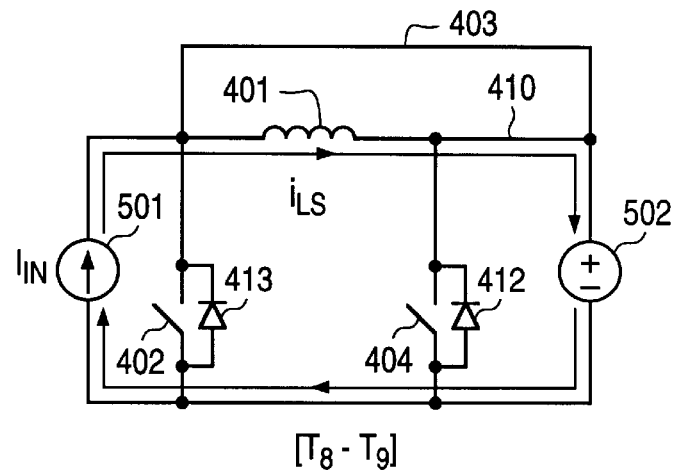
Figure 9A:
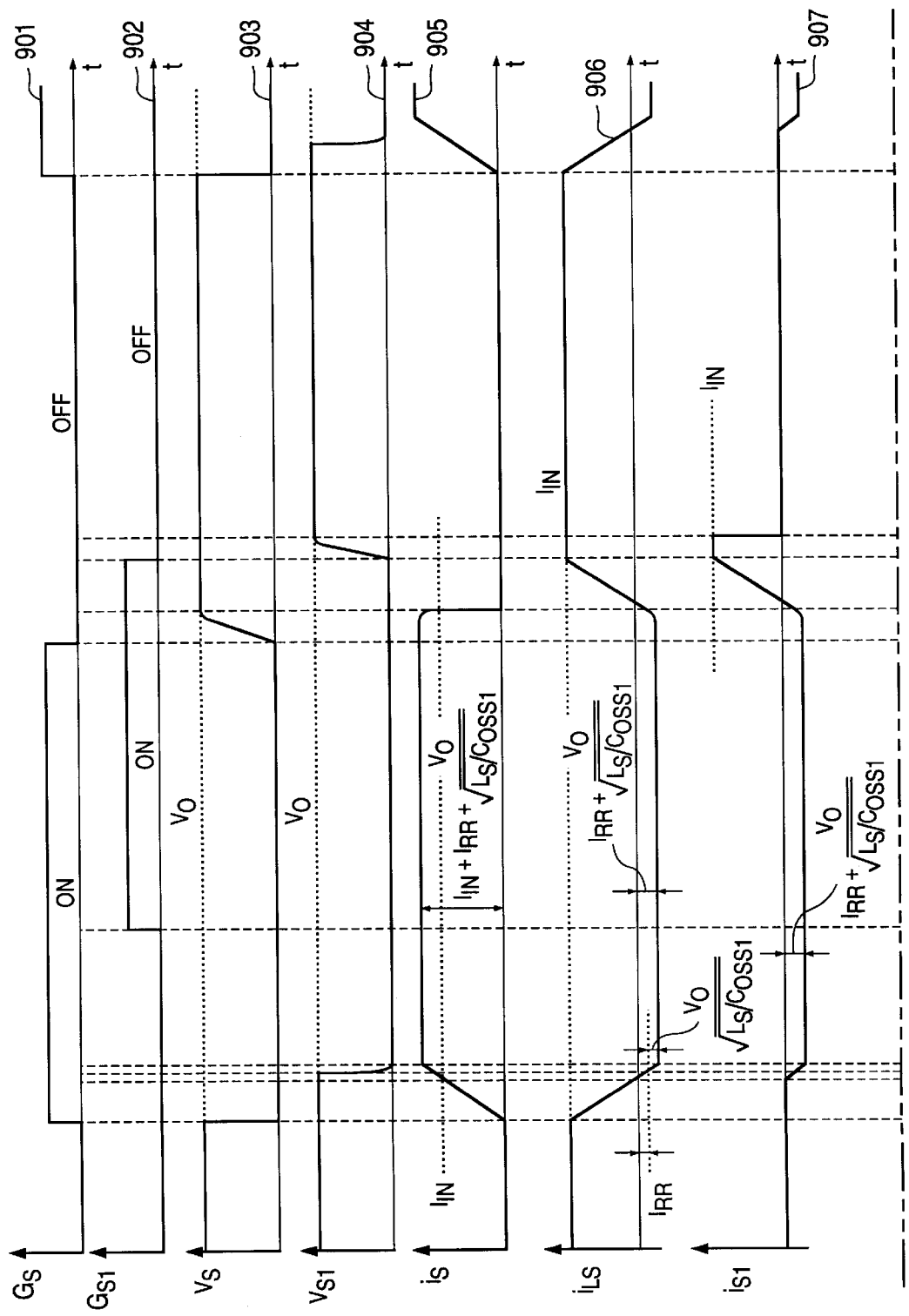
FIG. 9 shows key waveforms of boost power stage 400 under the alternative mode of operation illustrated by FIGS. 8(a)–8(i).
Figures 9, 9B:
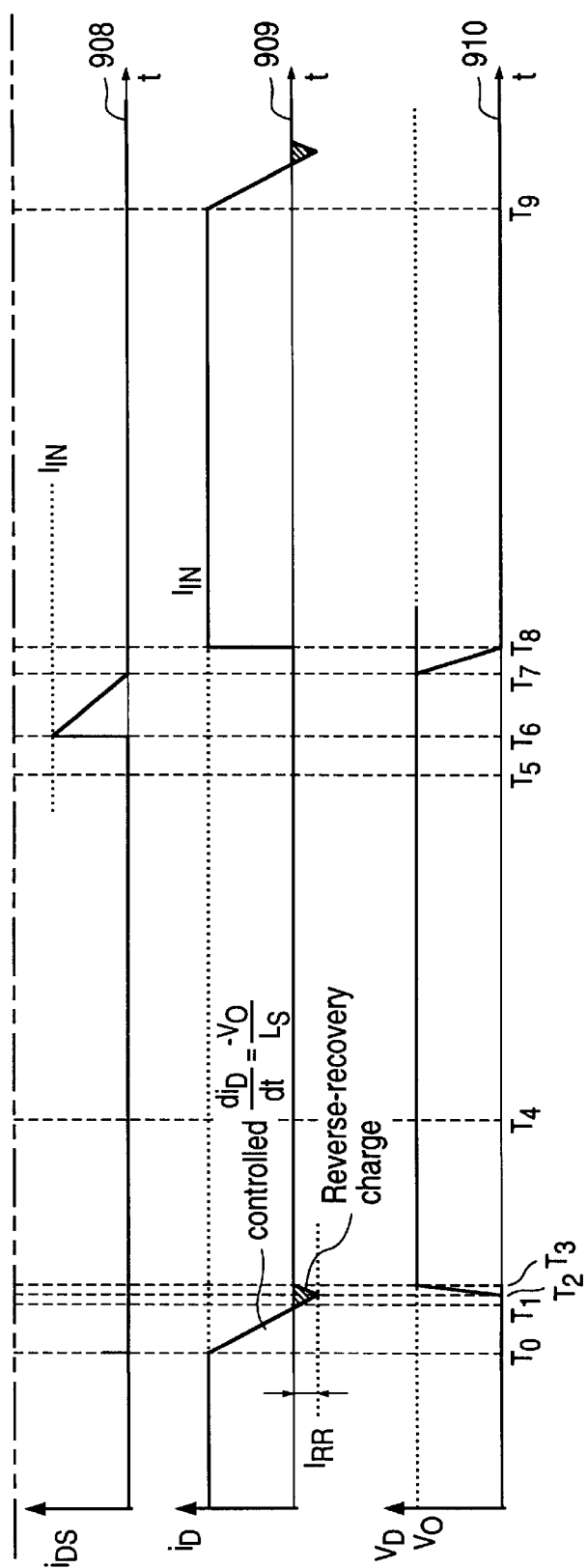

FIGS. 8(a)–8(i) show an alternative mode of operation which results if auxiliary switch 404 is opened immediately after current $i_{DS}$ of snubber rectifier 403 falls to zero at time t=T$_7$. FIGS. 8(a)–8(g) are identical to FIGS. 6(a)–6(g) discussed above. The key waveforms 901–910 of this alternative mode of operation are provided in FIG. 9. Waveforms 901–910 of FIG. 9 correspond to waveforms 601–610 of FIG. 6 and in fact, the portions of waveforms 901–910 for the period between time t=T$_0$ to time t=T$_7$ are identical to the corresponding portions of waveforms 601–610 for the same time period. When auxiliary switch 404 opens at time t=T$_7$, i.e., when current $i_{DS}$ (waveform 908) in snubber rectifier 403 becomes zero, the current $i_{S1}$, (waveform 907) in auxiliary switch 404 charges output capacitance 601 (C$_{OSS1}$), as shown in FIG. 8(h), increasing voltage $v_{S1}$ (waveform 904) across auxiliary switch 404 towards voltage V$_O$. When voltage V$_{S1}$ reaches V$_O$ at time t=T$_8$, current $i_{S1}$ (waveform 907) in auxiliary switch 404 becomes zero, and current I$_{IN}$ flows through snubber inductor 401 and boost rectifier 410, as shown in FIG. 8(i). Boost power stage 400 remains in this state until boost switch 402 is closed at time t=T$_9$, which brings boost power stage 400 to the same state as that shown in FIG. 8(a) for time t=T$_0$.

Control of boost power stage 400 can be implemented in the same manner as a conventional "hard" switched power stage, using conventional gate-driver circuits. Specifically, in input-current-shaping applications, boost power stage 400 can be implemented with any known control technique, such as average-current, peak-current, or hysteretic control.

The performance of boost power stage 400 with an active snubber was experimentally evaluated on a 1 kW (375 V/2.67 A), universal-line-range (90–265 V$_{in}$) power-factor-correction circuit operating at 80 kHz. The experimental circuit has these components: boost switch 402 is provided by an IXGK50N60 IGBT; auxiliary switch 404 is provided by a 2SK2837 MOSFET; boost rectifier 410 is provided by two RHRP3060 rectifiers connected in parallel; boost inductor 407 is provided by a 0.8 mH inductance; snubber inductor 401 is provided by a 4.7 µH inductor; snubber rectifier 403 is provided by a RHRP3060 rectifier, and filter capacitor 408 is provided by two 470 µF/450 V capacitors connected in parallel. Boost inductor 407 was built using Magnetics toroidal core (Kool Mu 77439-A7, two cores in parallel) and 55 turns of AWG#14 wire, and snubber inductor 403 was built with Magnetics toroidal core (MPP 55550-A2, two cores in parallel) with 9 turns of AWG#14 wire. Providing a 4.7 µH inductor for snubber inductor 401 limits the rate of turn-off snubber rectifier current change (di/dt) to di/dt=V$_O$/L$_S$=80 A/µs. The control circuit for the experimental circuit was implemented with an average-current PFC controller UC3854. TC4420 and TSC429 drivers are used to generate the required gate-drive signals for the boost switch 402 and auxiliary switch 404, respectively.

Table 1 shows the measured efficiencies of the experimental converter with and without the active snubber at the minimum and maximum line voltages, as functions of the output power. As shown in Table 1, for both line voltages, the active snubber improves the conversion efficiency at higher output-power levels (e.g., >600 W). Nevertheless, the efficiency improvement is more pronounced at the minimum line and higher power levels where the reverse-recovery losses are greater. Specifically, at the maximum line (265 V$_{AC}$), the efficiency improvement at 1 kW is 0.3%. However, at the minimum line voltage, without the active snubber, the boost power stage cannot deliver more than approximately 900 W due to thermal runaway of the boost rectifier as a result of excessive reverse-recovery losses. At 900 W. the active snubber improves the efficiency by approximately 3%, which translates into approximately 30% reduction of the losses.

TABLE 1

Measured efficiency of the experimental boost converter input-current-shaper in the 200-W to 1-kW range at the minimum line voltage (90 V$_{AC}$) and maximum line voltage (264 V$_{AC}$) with and without the active snubber of the present invention:

| Power | Without active snubber | | with active snubber | |
|---|---|---|---|---|
| (W) | V$_{IN}$=90 V$_{AC}$ | V$_{IN}$=264 V$_{AC}$ | V$_{IN}$=90 V$_{AC}$ | V$_{IN}$=264 V$_{AC}$ |
| 200 | 94.2% | 97.5% | 93.2% | 96.6% |
| 300 | 93.9% | 97.8% | 93.4% | 97.1% |
| 400 | 93.6% | 98.1% | 93.3% | 97.5% |
| 500 | 93.2% | 97.8% | 93.8% | 97.5% |
| 600 | 93.0% | 98.0% | 94.4% | 97.8% |
| 700 | 92.7% | 97.9% | 94.5% | 98.5% |
| 800 | 92.0% | 97.8% | 93.8% | 98.6% |
| 900 | 90.5% | 98.1% | 93.4% | 98.5% |
| 1000 | n/a | 98.1% | 92.5% | 98.4% |

The above detailed description is provided to illustrate specific embodiments of the present invention and is not intended to be limiting. Numerous variations and modification within the scope of the invention are possible. The present invention is set forth in the following claims.

We claim:

1. A boost converter receiving an input signal and providing an output voltage at an output terminal, comprising:
   (a) a boost inductor having a first terminal and a second terminal, said first terminal of said boost inductor being coupled to receive said input signal;
   (b) a first switch coupled between a ground reference and said second terminal of said boost inductor;
   (c) an active snubber comprising:
      (1) a snubber inductor having a first terminal and a second terminal, said first terminal of said snubber inductor being coupled to said second terminal of said boost inductor;
      (2) a snubber rectifier coupled between said second terminal of said boost inductor and said output terminal; and
      (3) a second switch coupled between said second terminal of said snubber inductor and said ground reference; and
   (d) a boost rectifier coupled between said second terminal of said boost inductor and said output terminal.

2. A boost converter as in claim 1, further comprising a diode coupled in parallel with said first switch.

3. A boost converter as in claim 1, further comprising a diode coupled in parallel with said second switch.

4. A boost converter as in claim 1, wherein said first and second switch are conducting over overlapping time periods.

5. A boost converter as in claim 1, wherein, subsequent to opening of said first switch, said second switch is open immediately upon said snubber rectifier becomes nonconducting.

6. A boost converter as in claim 1, wherein said first switch comprises an insulated gate bipolar transistor.

7. A boost converter as in claim 1, wherein said second switch comprises a field effect transistor.

8. A boost converter as in claim 1, wherein said second switch is closed under zero-voltage-switching condition.

9. A boost converter as in claim 1, wherein said second switch is driven by a non-isolated gate drive circuit.

10. A boost converter as in claim 1, wherein said first switch comprises a field effect transistor.

11. A boost converter as in claim 1, wherein said second switch comprises an insulated gate bipolar transistor.

* * * * *